US008649803B1

(12) United States Patent
Hamill

(10) Patent No.: US 8,649,803 B1
(45) Date of Patent: Feb. 11, 2014

(54) INTERACTIVE TRACKING VIRTUAL WORLD SYSTEM

(76) Inventor: Kristan Lisa Hamill, Nokomis, FL (US)

(*) Notice: Subject to any disclaimer, the term of this patent is extended or adjusted under 35 U.S.C. 154(b) by 0 days.

(21) Appl. No.: 13/463,730

(22) Filed: May 3, 2012

Related U.S. Application Data

(60) Provisional application No. 61/482,010, filed on May 3, 2011.

(51) Int. Cl.
H04W 24/00 (2009.01)
(52) U.S. Cl.
USPC .......................... 455/456.3; 455/457; 455/566
(58) Field of Classification Search
USPC .............. 455/456.3, 457, 566, 414.1; 705/14; 463/31, 39; 715/757
See application file for complete search history.

(56) References Cited

U.S. PATENT DOCUMENTS

| | | | |
|---|---|---|---|
| 6,527,641 B1* | 3/2003 | Sinclair et al. | 463/39 |
| 6,932,705 B2* | 8/2005 | Nakazato | 463/31 |
| 7,738,883 B2* | 6/2010 | Hull | 455/456.3 |
| 7,946,919 B2 | 5/2011 | Piccionelli | 463/31 |
| 2002/0090985 A1* | 7/2002 | Tochner et al. | 463/1 |
| 2006/0046699 A1* | 3/2006 | Guyot et al. | 455/414.1 |
| 2006/0075055 A1* | 4/2006 | Littlefield | 709/206 |
| 2006/0155597 A1 | 7/2006 | Gleason | 705/14 |
| 2006/0235790 A1* | 10/2006 | Jung et al. | 705/39 |
| 2006/0281553 A1 | 12/2006 | Hawkins, III et al. | 463/42 |
| 2007/0130001 A1* | 6/2007 | Jung et al. | 705/14 |
| 2007/0191100 A1* | 8/2007 | Counts | 463/42 |
| 2009/0005140 A1 | 1/2009 | Rose et al. | 463/7 |
| 2009/0106672 A1* | 4/2009 | Burstrom | 715/757 |
| 2009/0209236 A1* | 8/2009 | Bloebaum et al. | 455/414.1 |
| 2009/0215469 A1* | 8/2009 | Fisher et al. | 455/456.3 |
| 2009/0227374 A1 | 9/2009 | Tirpak et al. | 463/40 |
| 2010/0050237 A1 | 2/2010 | Bokor et al. | 726/4 |
| 2011/0055927 A1 | 3/2011 | Hamilton, II et al. | 726/26 |
| 2011/0124399 A1 | 5/2011 | Dutilly et al. | 463/25 |
| 2011/0165893 A1* | 7/2011 | Hyung et al. | 455/457 |
| 2011/0300923 A1 | 12/2011 | Van Luchene | 463/25 |
| 2012/0040763 A1 | 2/2012 | Auterio et al. | 463/42 |
| 2012/0052953 A1 | 3/2012 | Annambhotla et al. | 463/40 |
| 2012/0058801 A1* | 3/2012 | Nurmi | 455/566 |

* cited by examiner

Primary Examiner — Charles Shedrick
(74) Attorney, Agent, or Firm — Pillsbury Winthrop Shaw Pittman LLP

(57) ABSTRACT

An Interactive Tracking Virtual World (ITVW) system, may be utilized with other systems accessible through the Internet and/or a communications network. The ITVW system may be operable as an online game and/or to provide a virtual environment. ITVW system users (i.e., ITVW users) may be individuals or groups, such as parents and/or their children, which utilize the ITVW system for tracking an identity within the ITVW system. The ITVW system may also include ITVW system participants (i.e., ITVW participants), such as commercial business establishments, individuals and/or other entities associated with the ITVW system. The ITVW system collects an ITVW user's location information and location history.

16 Claims, 5 Drawing Sheets

INTERACTIVE TRACKING VIRTUAL WORLD SYSTEM

CROSS-REFERENCE TO RELATED APPLICATIONS

This application claims the benefit of U.S. Patent Application Ser. No. 61/482,010, entitled "INTERACTIVE TRACKING VIRTUAL WORLD SYSTEM", filed May 3, 2011, which is hereby incorporated by reference into the present disclosure in its entirety.

FIELD

This disclosure relates to the implementation of a virtual space that reflects the real-world activities of users as a mechanism for incentivizing and/or monitoring real-world activities by the users.

BACKGROUND

Systems that provide virtual spaces, such as virtual worlds and/or other virtual spaces, to users are known. Generally, these virtual spaces are devoid of effect caused by real world activities of the users. As a result, interaction of the users with the virtual space is typically limited to "in-game" activities.

Systems that provide real-world location monitoring of, for example, children or other subordinates are known. Typically these systems are monolithic systems that provide little to no incentive or engagement to the individuals being monitored, other than fulfilling a requirement being imposed by the monitoring party.

SUMMARY

An Interactive Tracking Virtual World (ITVW) system, may be utilized with other systems accessible through the Internet and/or a communications network. The ITVW system may be operable as an online game and/or to provide a virtual environment. ITVW system users (i.e., ITVW users) may be individuals or groups, such as parents and/or their children, which utilize the ITVW system for tracking an identity within the ITVW system. The ITVW system may also include ITVW system participants (i.e., ITVW participants), such as commercial business establishments, individuals and/or other entities associated with the ITVW system. The ITVW system collects an ITVW user's location information and location history. The collected information may be used to create an interactive virtual environment which may overlay a map, such as a map in a geographical mapping program.

An ITVW user may log into a secure website where an ITVW user identification may be verified. If parental permission is required, a parent identification may also be verified. From within the ITVW system, the ITVW user may invite "friends", such as individuals or other entities to become a member of the ITVW user's virtual world. The friends may be tagged with identifiers to denote a personal connection with the ITVW user. Multiple ITVW users may use the ITVW system simultaneously to reflect an online community. An ITVW child user may pick an avatar and/or a nickname. These identifiers may become the ITVW child user's identity online without disclosing personal information through the ITVW system. In the virtual world of the ITVW system, graphics may be selected according to an original theme developed by an ITVW user. A pre-existing theme may also be adopted by an ITVW user. The virtual world may be fully customizable. Examples of theme graphics are a rain forest, the undersea, or outer space and may contain cartoon-like graphics with some animation. The graphics in the virtual world may then overlay a real world geographical map. In one example, the overlay may convert an aerial view of an ITVW user's city or hometown into a graphical rendition of the real world city or hometown.

The ITVW system may be operable through a secure online website or a portal. The ITVW system may receive data originating at a tracking device. The tracking device may be worn or held by an ITVW user. The tracking device may be a cell phone or some other personal tracking device. The tracking device transmits tracking information relating to the ITVW user. The ITVW system may also receive data originating at a function in an another system, such as a communication system. The function may be any system which receives and communicates information associated with the tracking device. Examples of communication systems including a function operable with a tracking device and the ITVW system include a global positioning system (GPS) satellite system, a land-based GPS and/or a Global System for Mobile Communications (GSM). These communication systems all have an enabled location tracking function which is operable to provide an ITVW user's location information in addition to other information associated with an ITVW user. The tracking device may communicate wirelessly with the function in the communications system using, for example, a cellular service. Other forms of wireless communication may also be used.

The information from the tracking device and/or the communication system function may include various types of location-based information associated with an ITVW user. Location-based information originating from the tracking device may include an ITVW user's geographical coordinates at a discrete point in time, the ITVW user's velocity, elevation, movement direction and identity, time stamp, an ITVW user ID, any stored data from previous visits with an ITVW participant, time stamps, and/or rules for interacting with ITVW participants or the ITVW system. In addition, the communications system function may also provide location information. This information may originate from the tracking device and/or the tracking function. Location information originating from the communication system function may include an ITVW user ID, any stored data from previous visits with an ITVW participant, time stamps, and/or rules for interacting with ITVW participants or the ITVW system in addition to information unique to the communication system such as participant ID, participant data, potential event data, or transaction data associated with a visit.

The location information transmitted from the tracking device may be stored in a database or a memory utilized by the ITVW system. The ITVW database may provide location information to the ITVW system in real-time, at recurring intervals, or in response to an event or program routine. The received location information may enable the ITVW system to activate events in the virtual world of the ITVW system. The location information delivered by the tracking device may be used in a number of ways.

One utilization is to enable a third party, such as a parent of an ITVW user, to identify where the ITVW user may be located by displaying a current location and/or a location history on a map. The ITVW system may provide the parent with the ability to set up one or more "geofences" around the ITVW user. The geofence is a region or area in the ITVW system defined with a boundary line. Crossing the boundary line may cause or initiate an event in the ITVW system, such as triggering a push notification to the ITVW user and/or the parent. The geofence may be time or condition related. For example, the parent may elect to receive push notifications when a ITVW child user takes a certain action, such as leaving a school's grounds before the school closes. If a child leaves school early, the ITVW system may create an alert which is sent to a parent.

A user's location information in combination with the geofence function can influence or initiate events in a virtual game environment. For example, a geofence boundary and time conditions may be created by a parent to yield an event in the game. For example, creating a geofence around a school grounds lasting from 8 am to 3 pm. If the child with the tracking device enters school grounds before 8 am and stays within the geofence for the entire day until 3 pm, the ITVW child user may be rewarded with points for arriving on time and spending the whole day at school.

Another way the location information may be utilized in the ITVW system is within a dynamic online gaming environment. In the dynamic gaming environment, as an ITVW user carrying a tracking device moves through their real world environment, the tracking device transmits information. A function in a system may also transmit information. The transmitted information is received at the ITVW system. The received information from the tracking device and/or communication system function may trigger certain elements to change in the ITVW user's virtual online environment. The ITVW system may also utilize the received information to interact with internal or external databases associated with business locations, historical places, government or municipal operating locations and/or other establishments within the community. These interactions may generate events in an online game associated with the ITVW system. The interaction events may be programmed, for example, by the ITVW user, an ITVW system administrator, a parent or another third party, such as one of the business establishments located in a geographical region associated with the ITVW user's virtual world.

Other examples of these events include the ITVW user stopping at an ice cream store on the way home from school. The ITVW system generates a notice that the ice cream store is present or added to the virtual world environment. This is a generated event in the game which may operate to open a "magical door" which enables the ITVW child user to scoop ice cream in the gaming environment. Arrangements for having the ice cream store as an ITVW participant may be contracted in advance or accomplished through a participant registration process. The participant registration and the online game event are an advertizing opportunity for the ITVW participant. When the ITVW child user logs back into his or her online virtual game world, the ITVW child user's environment may appear different based on where the child traveled in the physical world.

The online environment presented through the ITVW system may change in a number of ways. An ITVW user's GPS location may trigger a simple event like displaying an ITVW participant's business name and logo on a map of the virtual world in the game. The business logo may be a link to advertise a promotion or offer something to the ITVW user, such a real and/or virtual souvenir. In another example, the GPS location may open a gateway or create a link that gives access to a new section of the virtual world. In other words, the link may give access to new games, new game world, social hubs, or downloadable content. It is the GPS device's location that opens the virtual world for the ITVW child user to enhance the virtual experience with the ITVW system. Each user's game environment may be unique to each user depending on where the user has traveled.

Participants may be business partners with the ITVW system. These participants have a new marketing channel specific to ITVW users (children and families) for brand promotion, education and entertainment by using the ITVW system game environment as a new advertising medium.

The tracking device may store its daily interactions with location functions, such as GPS and/or GSM. In this example, the tracking device transmits the information to a server housing the ITVW database. Programmed routines may then determine how the online virtual environment may be updated to reflect where the user has been. When the ITVW user logs into their personalized virtual world associated with the ITVW system, their profile may be updated providing additional ITVW activities in their environment. Activities may be associated with a product or service provided by an ITVW participant. Examples include playing music in a virtual music store in the virtual environment of the ITVW system if the ITVW user had recently visited a music store of an ITVW participant, or watching a movie through the secure online website if the ITVW participant is associated with movie content.

An ITVW user may subscribe to the ITVW online game environment as an ITVW user. The ITVW child user may purchase or obtain a tracking device and register it with the ITVW system. The GPS location information transmitted from the tracking device may be received at the ITVW system and stored in an ITVW system database. This stored information may be cross-referenced with select ITVW participants, such as businesses or other establishments. The information generated in the cross referencing may activate parts of the virtual world environment. This provides the ITVW user access to new ITVW system environment virtual locations. The virtual locations may provide, for example, promotions, games, and content within the virtual world.

According to an example, a child ITVW user may initiate ITVW system activity by logging into a website associated with the ITVW system. If this is a first visit, the ITVW child user may choose a rainforest environment and select a monkey avatar. If the he has not developed a location tracking history, he will see a few square miles of his home town turned into an amusing version of the rainforest with streets that look like dirt paths and buildings that look like giant tropical flora. He may want to invite friends to be part of his group, and visit with his friends in the virtual world.

Once the ITVW child user develops a tracking history, some of the tropical flora may reveal business logos, links and information bubbles reflecting ITVW participant establishments in places that exist in the real world and virtual establishments which appear for gaming purposes. In the virtual world, these businesses and places become unlocked, accessible, or open for business when visited by the child user, or some other system defined event occurs. The ITVW child user may click a link and enter the virtual location to play games, receive promotions, download content and meet friends.

The ITVW system provides other benefits. The web environment may use tracking technology to grant access to games in an amusing, fanciful online environment. For parents, knowing where their child is located brings peace of mind. Should the child go missing, the parent has an alternative way to find the child using the ITVW system. For the child, the online environment lends itself to being a fun social environment where games are discovered based on their personal tracking history presented in a treasure hunt like fashion. The ITVW system also provides an incentive for a child to carry a tracking device or cell phone. Themes in the ITVW system virtual environment themes may provide a method of communicating educational messages.

An ITVW child user may also be a participant or even contribute content or modifications to the virtual world through the ITVW system. In an example, the child user creates a virtual version of her own home which is accessible by invitation to her friends. Or the child user may create a virtual version of a school which might have homerooms that are customized by an authorized individual or group of ITVW system users.

For businesses as ITVW participants, the virtual environment creates a channel for child and family specific marketing. It also gives local businesses more advertising opportunities. The ITVW system may also interact with other online or virtual world gaming systems. The ITVW system may also be used to sell advertising at the local business level and place the locations of the virtual world map. In another example, an ITVW user may be charged a monthly subscription amount to access a certain number of games. Embedded downloadable content may also be provided.

Below is a list of examples showing different methods by which location information may be implemented through the ITVW system to change an online gaming environment. In these examples, a tracking device utilizing the GPS system transmits location information to the ITVW system for a virtual online gaming environment.

A visit to the local museum may open a link on the game site to a virtual museum where the character avatars may paint and hang a picture on the virtual wall.

A visit to the local music store may open a link in the game to a virtual music store that offers music downloads.

A visit to the local state park may offer a link to virtual park where users may learn about preservation and earn coins.

A visit to the local airport may open a link where users may catch a virtual flight to another virtual city.

A visit to the local toy store may open a link where users may download a coupon.

A visit to a local book store may open a link that enables users to vote for a favorite book.

A visit to the playground may open a link to another virtual world.

While the examples have been described with reference to the disclosure above, those skilled in the art are able to make various modifications to the described examples without departing from the scope of the examples as described in the following claims, and their equivalents.

DETAILED DESCRIPTION

Figure 1:
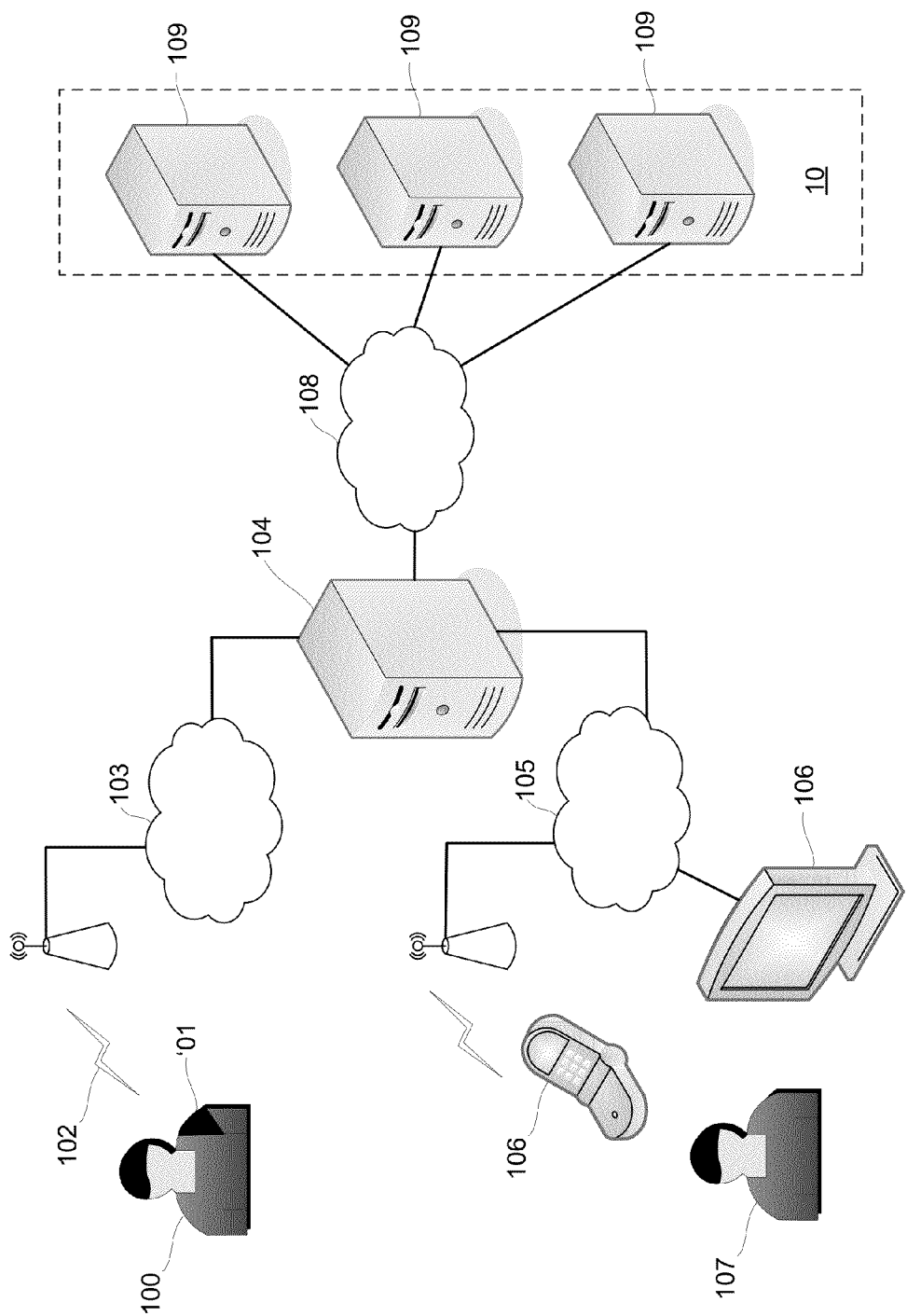
FIG. 1 illustrates a virtual world system.

FIG. 1 illustrates an example of an ITVW system 10 including ITVW servers 109. The ITVW system 10 may receive input data from various sources outside the ITVW system 10. An ITVW system child user 100 wears a tracking device 101, which is registered in advance with the ITVW system 10. The tracking device 101 transmits location information via a wireless link 102 and communications network 103 to a communications server 104 which transmits the location information over the Internet 108 to the ITVW system 10, where it is stored on the ITVW servers 109. The ITVW servers 109 include storage and software which prepare a representation of a virtual world. A representation of the virtual world may be transmitted from the ITVW system 10 to the Internet 108. The transmitted virtual world representation is received by an ITVW system user 107 via a communications network 105 and various human interface devices 106. The communications server 104 may also receive participant data from ITVW system participants and transmit this over the Internet 108 to the ITVW system 10.

Figure 2:
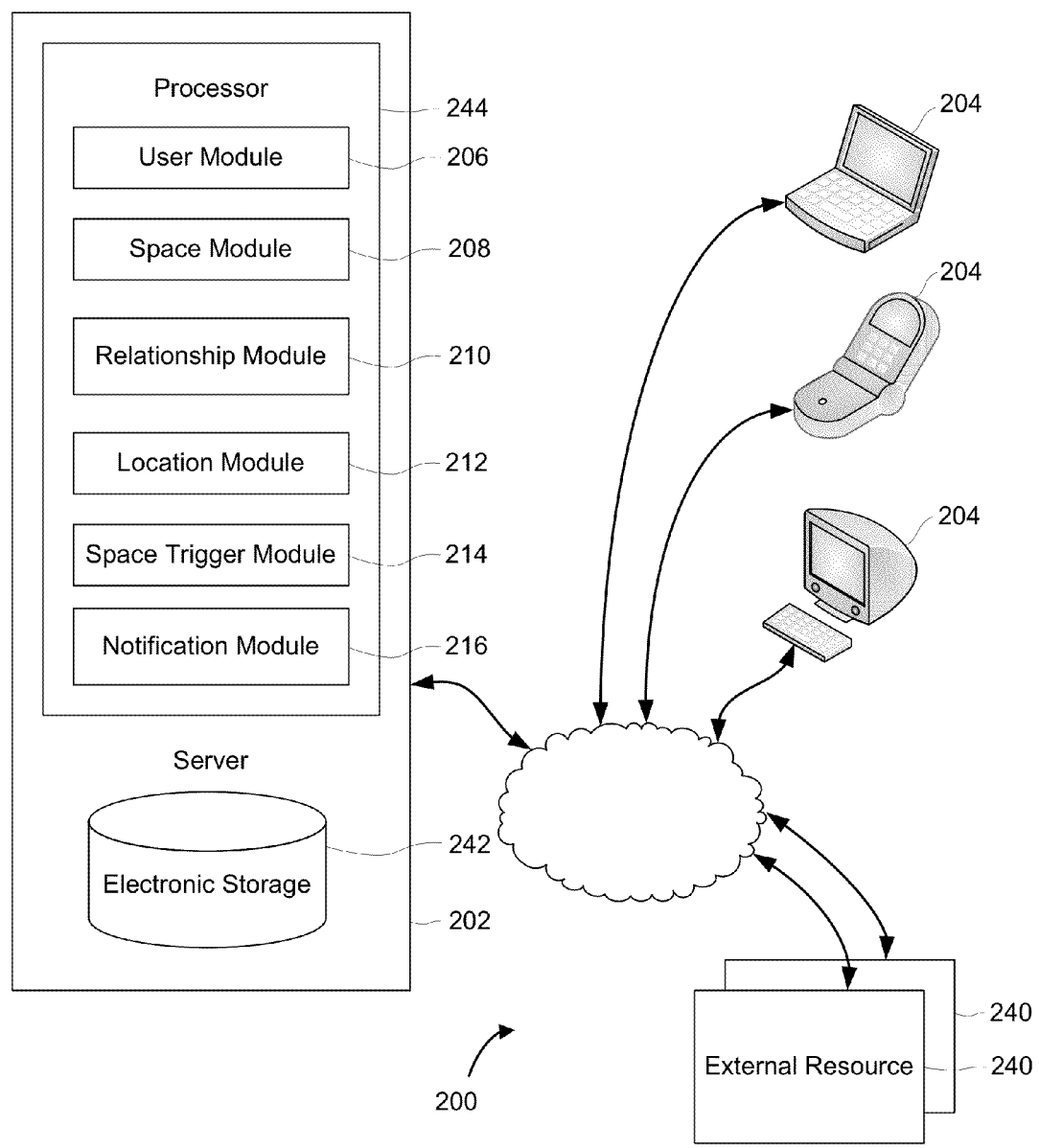
FIG. 2 illustrates a system configured to host a virtual space to users that reflects the real-world activities of the users.

FIG. 2 illustrates a system 200 configured to provide a virtual space to users. System 200 may be configured such that the virtual space may be impacted by real-world actions of the users. Real-world actions of the users may be tracked, for example, tracking the real-world locations of the users. Certain real-world actions may be incentivized by providing a positive impact associated with such real-world actions in the virtual space. Information related to the real-world locations of the users may be provided to supervisors of the users, such as parents and/or other supervisors. Providing the virtual space may include hosting the virtual space over a network.

In some implementations, system 200 may include a server 202. The server 202 may be configured to communicate with one or more client computing platforms 204 according to a client/server architecture. The users may access system 200 and/or the virtual space via client computing platforms 204.

Server 202 may be configured to execute one or more computer program modules. The computer program modules may include one or more of a user module 206, a space module 208, a relationship module 210, a location module 212, a space trigger module 214, a notification module 216, and/or other modules.

User module 206 may be configured to manage user information associated with users of system 200. The user information may include user accounts and/or other user information associated with users of the system 200. The user accounts and/or other user information may include information stored by server 202, one or more of the client computing platforms 204, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 208 may be configured to implement the instance of the virtual space executed by the computer modules to determine views of the virtual space. The views may then be communicated (e.g., via streaming, via object/position data, and/or other information) from server 202 to client computing platforms 204 for presentation to users. The view determined and transmitted to a given client computing platform 204 may correspond to a user character, or avatar, being controlled by a user via the given client computing platform 204. The view determined and transmitted to a given client computing platform 204 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 204) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 208 is not intended to be limiting. The space module 208 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 208, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user, such as an avatar. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 204. The users may interact with each other through communications exchanged within the virtual space. Such communications may include one or more of textual chat, instant messages, private messages, voice communications, and/or other communications. Communications may be received and entered by the users via their respective client computing platforms 204. Communications may be routed to and from the appropriate users through server 202 (e.g., through space module 208).

The relationship module 210 may be configured to establish relationships between users within the virtual 210. Such relationships may include one or more of friendships, guilds (with guild-mates), alliances, connections, followers, and/or other relationships. The relationship module 210 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships that a social construct within the virtual space that does not have a functional result.

In some implementations, one of the classes of relationships provided by a system 200 may include an observer/target relationship. An observer may include a user that has privileges within the virtual space and/or system 200 generally to observe information related to use of system 200 by one or more target users. For example, an observer may be a parent that has privileges that facilitate observation of information related to user of system 200 by one or more of the parents children, which may be target users. As is described herein, in some implementations, an observer may have control over the access of a target to the virtual space, use of the virtual space by the target, and/or control over the experience of the target within the virtual space. An observer/target relationship may be established between users at the time of user account creation (e.g., by a parent or guardian authorizing the new account of a child user), and/or at other times.

Location module 212 may be configured to obtain location information indicating the real-world locations of the users of system 200 (e.g., as described above, or elsewhere herein). Location module location module 212 may be configured to obtain such location information from devices being carried by the users. In some implementations, the devices may include client computing platforms 204, and/or other devices (e.g., dedicated tracking/geolocation devices). The location information may include information obtained by the devices, and then communicated to location module server 202 (e.g., wirelessly). The location information may indicate times at which the users were at the indicated locations.

Space trigger module 214 may be configured to trigger events within the virtual space based on the location information obtained by location module 212. By way of illustration, a first event may be triggered based on a first user breaching a geofence surrounding or associated with a location in the real-world. Determination that the first user has breached the geofence may be made by space trigger module 214 based on location information for the first user. The first event may have an impact within the virtual space. The impact may include, for example, an award (or loss) of points, gold, experience points, gems, jewels, and/or other virtual currency; unlocking of content within the virtual space (e.g., one or more additional areas, buildings, rooms, and/or other content); reception of a virtual item; alteration of the visual expression of the virtual space in views provided to the user (e.g., with the addition of branding or badges in the views), and/or other impacts. One or more impacts of the first event triggered by space trigger module 214 may be apparent in the views of the virtual space provided to the first user by space module 208. One or more of the impacts of the first event may apparent in views of the virtual space provided to other users by space module 208. For example, an avatar associated with the first user may bear a visual indicator (and/or some other indicator) of one or more impacts of the first event.

The triggering of the first event may be conditioned on a time at which the geofence was breached. For example, there may be a time period during which the breach of geofence results in the triggering of the first event. As an example, there may be a time period during which breach of the geofence does not result in the triggering of the first event (e.g., if it would otherwise).

Space trigger module 214 may be configured such that one or more of the events, the circumstances that cause the one or more events, the impact of the one or more events, and/or other aspects of the one or more events are configured by users. For example, an observer may configure one or more events that incentivize a target user (e.g., with positive or desirable impacts in the virtual space) to perform real-world tasks. As another example, a real-world merchant, brand, or service provider may configure one or more events that incentivize users generally to perform real-world tasks that are beneficial to the real-world merchant, brand, or service provider (e.g., visit a place of business and/or other tasks). Space trigger module 214 may be configured such that configuration of an event may require monetary compensation from the user configuring the event. Space trigger module 214 may be configured to provide a user interface to users that facilitates the configuration of an event to be triggered by space trigger module 214.

Figure 3:
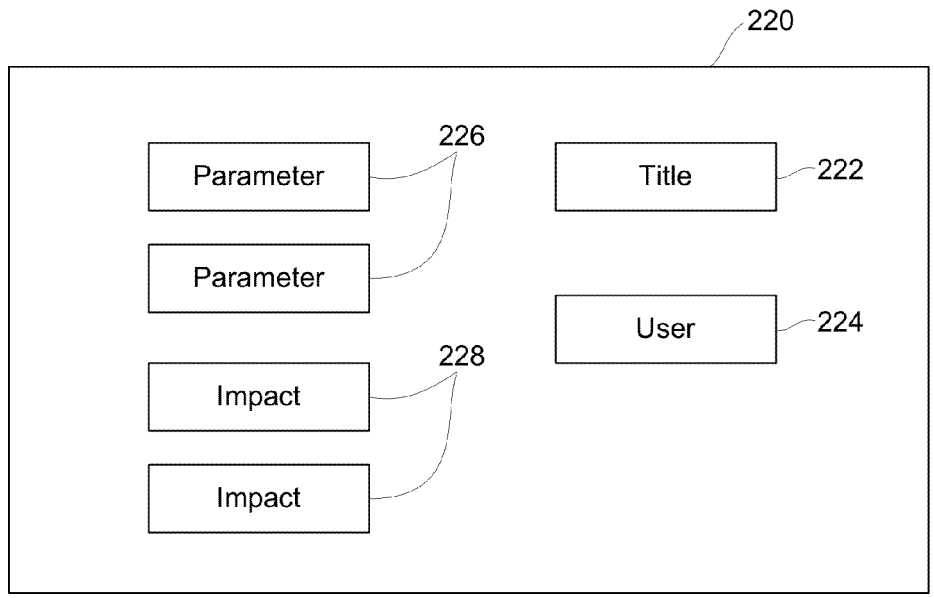
FIG. 3 illustrates a graphical user interface presented to users to facilitate customization of virtual space events that can be triggered through real-world activities.

By way of illustration, FIG. 3 illustrates a view 220 of a graphical user interface provided to users to configure an event in the virtual space. View 220 may include a title field 222, a user field 224, one or more trigger parameter fields 226, one or more event impact fields 228, and/or other fields or information. Title field 222 may be configured to receive entry and/or selection of a title for the event. User field 224 may be configured to receive entry and/or selection of a user (or group of users) for whom the event may be triggered in the virtual space. Entry and/or selection of a user (or group of users) may include one or more specification of a specific user, specification of one or more characteristics of users, and/or other specifications. Trigger parameter fields 226 may be configured to receive entry and/or selection of one or more trigger parameter that are used to trigger the event. A trigger parameter may include an real-world location parameter, an real-world time parameter, and/or other parameter. Event impact fields 228 may be configured to receive entry and/or selection of the parameter of the impact of the event. Provision of view 220 to users of a system (e.g., such as system 200) may enhance the engagement of users with the virtual space, may enhance user control and/or customization of the user experience, and/or may provide other enhancements to the virtual space.

Returning to FIG. 2, notification module 216 may be configured to provide notifications to observers related to the real-world activities of the corresponding target users. Notification module 216 may trigger notifications based on the location information for the target users obtained by space trigger module 214. For example, a first notification to a first observer may be triggered responsive to a first target user breaching a geofence surrounding or associated with a location in the real-world. Determination that the first user has breached the geofence may be made by notification module 216 based on location information for the first target user. The first notification may indicate to the first observer the breaching of the geofence. The notification may include a phone call, an email, a text message (e.g., an SMS message or other text message), a message within the virtual space, a message in a social networking platform (e.g., Facebook®, MySpace®, OpenFeint, and/or other social networking platforms), a game center message, a micro-blogging service message (e.g., such as a message in the platform provided by Twitter®, the platform provided by Tumblr®, and/or other micro-blogging platforms), and/or other notifications.

The triggering of the first notification may be conditioned on a time at which the geofence was breached. For example, there may be a time period during which the breach of geofence results in the triggering of the first notification. As an example, there may be a time period during which breach of the geofence does not result in the triggering of the first notification (e.g., if it would otherwise).

Notification module 216 may be configured such that one or more of the notifications, the circumstances that cause the one or more notifications, the impact of the one or more notifications, and/or other aspects of the one or more notifications are configured by users (e.g., the observers). For example, an observer may configure one or more notifications for one or more specific target users to monitor the real-world activities of the one or more specific target users. Notification module 216 may be configured to provide a user interface to observers that facilitates the configuration of a notification to be triggered by notification module 216.

Figure 4:
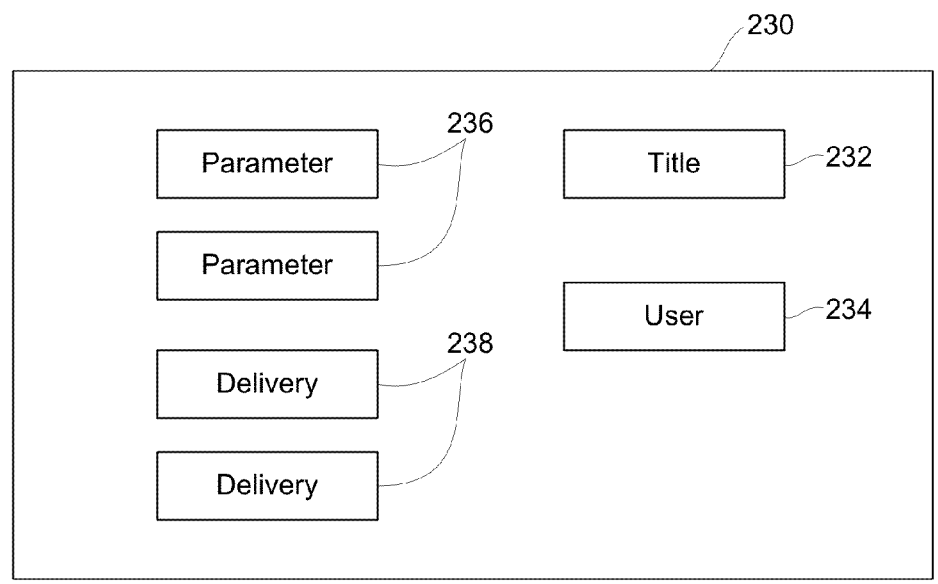
FIG. 4 illustrates a graphical user interface presented to users that facilitates customization of notifications that are triggered through real-world activities of virtual space users.

By way of illustration, FIG. 4 illustrates a view 230 of a graphical user interface provided to users to configure an event in the virtual space. View 230 may include a title field 232, a target user field 234, one or more trigger parameter fields 236, one or more notification delivery fields 238, and/or other fields or information. Title field 232 may be configured to receive entry and/or selection of a title for the notification. Target user field 234 may be configured to receive entry and/or selection of a target user (or group of target users) for whom the notification may be triggered in the virtual space. Entry and/or selection of a target user (or group of target users) may include one or more specification of a specific target user, specification of one or more characteristics of target users, and/or other specifications. Trigger parameter fields 236 may be configured to receive entry and/or selection of one or more trigger parameter that are used to trigger the notification. A trigger parameter may include an real-world location parameter, an real-world time parameter, and/or other parameter. Notification delivery fields 238 may be configured to receive entry and/or selection of the form in which the notification should be delivered to the observer. Provision of view 230 to observer users of a system (e.g., such as system 200) may provide a practical mechanism for monitoring the real-world activities of target users that is engaging and rewarding for the target users. This may enhance the likelihood of target users agreeing to participate in the monitoring activity, and/or provide other enhancements.

Returning to FIG. 2, In some implementations, server 202, client computing platforms 204, location devices (if separate from client computing platforms 204, not shown), and/or external resources 240 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 202, client computing platforms 204, and/or external resources 240 may be operatively linked via some other communication media.

A given client computing platform 204 may include one or more processors configured to execute computer program modules. The computer program modules may be configured to enable an expert or user associated with the given client computing platform 204 to interface with system 200 and/or external resources 240, and/or provide other functionality attributed herein to client computing platforms 204. By way of non-limiting example, the given client computing platform 204 may include one or more of a desktop computer, a laptop computer, a handheld computer, a NetBook, a Smartphone, a gaming console, and/or other computing platforms.

The external resources 240 may include sources of information, hosts and/or providers of virtual environments outside of system 200, external entities participating with system 200, and/or other resources. In some implementations, some or all of the functionality attributed herein to external resources 38 may be provided by resources included in system 200.

The server 202 may include electronic storage 242, one or more processors 244, and/or other components. The server 202 may include communication lines, or ports to enable the exchange of information with a network and/or other computing platforms. Illustration of server 202 in FIG. 2 is not intended to be limiting. The server 202 may include a plurality of hardware, software, and/or firmware components operating together to provide the functionality attributed herein to server 202. For example, server 202 may be implemented by a cloud of computing platforms operating together as server 202.

Electronic storage 242 may comprise electronic storage media that electronically stores information. The electronic storage media of electronic storage 242 may include one or both of system storage that is provided integrally (i.e., substantially non-removable) with server 202 and/or removable storage that is removably connectable to server 202 via, for example, a port (e.g., a USB port, a firewire port, etc.) or a drive (e.g., a disk drive, etc.). Electronic storage 242 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 242 may include one or more virtual storage resources (e.g., cloud storage, a virtual private network, and/or other virtual storage resources). Electronic storage 242 may store software algorithms, information determined by processor 244, information received from server 202, information received from client computing platforms 204, and/or other information that enables server 202 to function properly.

Processor(s) 244 is configured to provide information processing capabilities in server 202. As such, processor 244 may include one or more of a digital processor, an analog processor, a digital circuit designed to process information, an analog circuit designed to process information, a state machine, and/or other mechanisms for electronically processing information. Although processor 244 is shown in FIG. 2 as a single entity, this is for illustrative purposes only. In some implementations, processor 244 may include a plurality of processing units. These processing units may be physically located within the same device, or processor 244 may represent processing functionality of a plurality of devices operating in coordination. The processor 244 may be configured to execute modules 206, 208, 210, 212, 214, and/or 216. Processor 244 may be configured to execute modules 206, 208, 210, 212, 214, and/or 216 by software; hardware; firmware; some combination of software, hardware, and/or firmware; and/or other mechanisms for configuring processing capabilities on processor 244.

It should be appreciated that although modules 206, 208, 210, 212, 214, and/or 216 are illustrated in FIG. 2 as being co-located within a single processing unit, in implementations in which processor 244 includes multiple processing units, one or more of modules 206, 208, 210, 212, 214, and/or 216 may be located remotely from the other modules. The description of the functionality provided by the different modules 206, 208, 210, 212, 214, and/or 216 described below is for illustrative purposes, and is not intended to be limiting, as any of modules 206, 208, 210, 212, 214, and/or 216 may provide more or less functionality than is described. For example, one or more of modules 206, 208, 210, 212, 214, and/or 216 may be eliminated, and some or all of its functionality may be provided by other ones of modules 206, 208, 210, 212, 214, and/or 216. As another example, processor 244 may be configured to execute one or more additional modules that may perform some or all of the functionality attributed below to one of modules 206, 208, 210, 212, 214, and/or 216.

Figure 5:
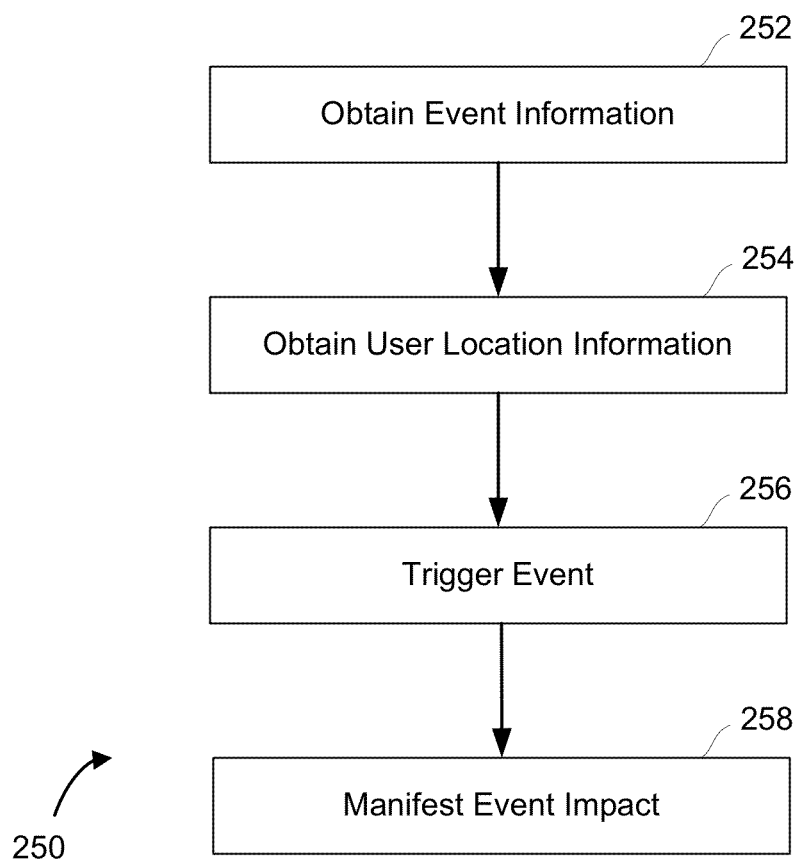
FIG. 5 illustrates a method of hosting a virtual space in which events may be triggered by real-world activities of the users.

FIG. 5 illustrates a method 250 of hosting a virtual space in which events may be triggered by real-world activities of the users. The operations of method 250 presented below are intended to be illustrative. In some embodiments, method 250 may be accomplished with one or more additional operations not described, and/or without one or more of the operations discussed. Additionally, the order in which the operations of method 250 are illustrated in FIG. 5 and described below is not intended to be limiting.

In some embodiments, method 250 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 250 in response to instructions stored electronically on an electronic storage medium. The one or more processing devices may include one or more devices configured through hardware, firmware, and/or software to be specifically designed for execution of one or more of the operations of method 250.

At an operation 252, event information related to a first event may be obtained. The event information may include one or more trigger parameters, one or more event impacts, a title, a user, and/or other information. The event information may be obtained, for example through a user interface presented to users to configure customized events. In some implementations, operation 252 may be performed by a space trigger module the same as or similar to space trigger module 214 (shown in FIG. 2 and described herein).

At an operation 254, user location information for a first user may be obtained. the user location information may indicate a real-world location of the first user. The user location information may include time information. In some implementations, operation 254 may be performed by a location module the same as or similar to location module 212 (shown in FIG. 2 and described herein).

At an operation 256, the first event may be triggered for the first user based on the obtained user location information. The first event may be triggered responsive to the obtained user location information indicating the first user has satisfied event criteria specified by the event information obtained at operation 252. In some implementations, operation 256 may be performed by a space trigger module the same as or similar to space trigger module 214 (shown in FIG. 2 and described herein).

At an operation 258, responsive to the triggering of the first event, event impact associated with the first event may be manifested for the first user in the virtual space. The impact may include, without limitation, an award, a change in the visual depiction of the virtual space, an enhance access to content in the virtual space, and/or other impacts in the virtual space. The impact may be dictated by the event information obtained at operation 252. In some implementations, operation 258 may be performed by a space trigger module the same as or similar to space trigger module 214 (shown in FIG. 2 and described herein) in conjunction with a space module the same as or similar to space module 208 (shown in FIG. 2 and described herein).

Figure 6:
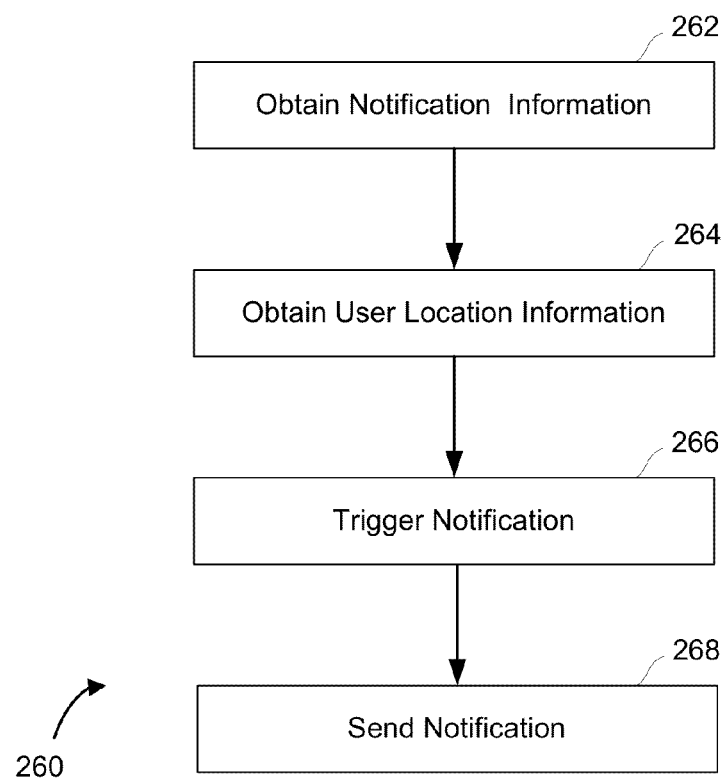
FIG. 6 illustrates a method of hosting a virtual space in which notifications to observers may be triggered by real-world activities of target users of the virtual space.

FIG. 6 illustrates a method 260 of hosting a virtual space in which notifications to observers may be triggered by real-world activities of target users of the virtual space. The virtual space may include events triggered based on the real-world activities of the target users (e.g., according to method 250 shown in FIG. 5) in order to enhance participation in the monitoring by the target users. The operations of method 260 presented below are intended to be illustrative. In some embodiments, method 260 may be accomplished with one or more additional operations not described, and/or without one or more of the operations discussed. Additionally, the order in which the operations of method 260 are illustrated in FIG. 6 and described below is not intended to be limiting.

In some embodiments, method 260 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 260 in response to instructions stored electronically on an electronic storage medium. The one or more processing devices may include one or more devices configured through hardware, firmware, and/or software to be specifically designed for execution of one or more of the operations of method 260.

At an operation 262, notification information related to a first notification may be obtained. The notification information may include one or more trigger parameters, one or more delivery mechanisms, a title, a target user, and/or other information. The notification information may be obtained, for example through a user interface presented to a first observer to configure customized notifications. In some implementations, operation 262 may be performed by a notification module the same as or similar to notification module 216 (shown in FIG. 2 and described herein).

At an operation 264, user location information for a first target user may be obtained. the user location information may indicate a real-world location of the first target user. The user location information may include time information. In some implementations, operation 264 may be performed by a location module the same as or similar to location module 212 (shown in FIG. 2 and described herein).

At an operation 266, the first notification may be triggered based on the obtained user location information. The first notification may be triggered responsive to the obtained user location information indicating the first target user has satisfied event criteria specified by the notification information obtained at operation 262. In some implementations, operation 266 may be performed by a notification module the same as or similar to notification module 216 (shown in FIG. 2 and described herein).

At an operation 268, responsive to the triggering of the first notification, notification may be transmitted to the first observer. The notification may include an email, a text message, a virtual space message, a phone call, and/or other messages or notifications. The notification may indicate the first notification has been triggered. In some implementations, operation 268 may be performed by a notification module the same as or similar to notification module 216 (shown in FIG. 2 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to host a virtual space, the system comprising:
 a server comprising one or more processors configured to execute computer program modules, the computer program modules comprising:
 a space module configured to execute an instance of a virtual space, and to implement the instance of the virtual space to provide view information to a client device that facilitates presentation of an interactive view of the virtual space through the client device;
 a location module configured to obtain real-world location information indicating a real-world location of a first user;
 a space trigger module configured to obtain event information specifying real-world location criteria that will trigger an event within the virtual space, to compare the real-world location information for the first user with the real-world location criteria for the event, and, responsive to the real-world location information indicating the first user has satisfied the real-world location criteria for the event, triggering the event for the first user in the virtual space,
 wherein the space trigger module is configured to obtain the event information for the event triggered for the first user via a graphical user interface configured to receive entry or selection of the event information from a second user that is different from the first user.

2. The system of claim 1, wherein the computer program modules further comprise a notification module configured to obtain notification information specifying real-world location criteria that will trigger a notification within the virtual space, to compare the real-world location information for the first user with the real-world location criteria for the notification, and, responsive to the real-world location information indicating the first user has satisfied the real-world location criteria for the notification, transmitting a notification transmission to an observer of the first user.

3. The system of claim 2, wherein the real-world location criteria for the notification is different from the real-world location criteria for the event.

4. The system of claim 2, wherein the real-world criteria for the notification is the same as the real-world criteria for the event.

5. The system of claim 2, wherein the notification module is configured to obtain the notification information via a graphical user interface configured to receive entry or selection of the notification information from the observer.

6. The system of claim 2, wherein the notification transmission includes one or more of an email, a message in a social networking platform, a message in a micro-blogging service, a text message, a phone call, or a virtual space message.

7. A system configured to host a virtual space, the system comprising:
- a server comprising one or more processors configured to execute computer program modules, the computer program modules comprising:
- a space module configured to execute an instance of a virtual space, and to implement the instance of the virtual space to provide view information to a client device that facilitates presentation of an interactive view of the virtual space through the client device wherein the space module is configured such that triggering of the event results in manifestation of one or more impacts associated with the event in the virtual space for a first user;
- a location module configured to obtain real-world location information indicating a real-world location of the first user;
- a space trigger module configured to obtain event information specifying real-world location criteria that will trigger an event within the virtual space, to compare the real-world location information for the first user with the real-world location criteria for the event, and, responsive to the real-world location information indicating the first user has satisfied the real-world location criteria for the event, triggering the event for the first user in the virtual space,
- wherein the space trigger module is configured to obtain the one or more impacts associated with the event for the first user within the virtual space via a graphical user interface configured to receive entry or selection of the one or more impacts from a second user.

8. The system of claim 7, wherein the space trigger module is configured such that the one or more impacts are only apparent in views of the virtual space provided to the first user.

9. The system of claim 7 wherein the space trigger module is configured such that the one or more impacts are apparent in views of the virtual space provided to a third user by the space module.

10. A computer-implemented method of hosting a virtual space, the method being implemented in a computer system that includes one or more processors configured to execute computer program modules, the method comprising:
- executing an instance of a virtual space;
- implementing the instance of the virtual space to provide view information to a client device that facilitates presentation of an interactive view of the virtual space through the client device;
- obtaining real-world location information indicating a real-world location of a first user;
- obtaining event information specifying real-world location criteria that will trigger an event within the virtual space;
- comparing the real-world location information for the first user with the real-world location criteria for the event; and
- responsive to the real-world location information indicating the first user has satisfied the real-world location criteria for the event, triggering the event for the first user in the virtual space,
- wherein the event information for the event triggered for the first user is obtained via a graphical user interface configured to receive entry or selection of the event information from the a second user that is different from the first user.

11. The method of claim 10, further comprising:
- obtaining notification information specifying real-world location criteria that will trigger a notification within the virtual space;
- comparing the real-world location information for the first user with the real-world location criteria for the notification; and
- responsive to the real-world location information indicating the first user has satisfied the real-world location criteria for the notification, transmitting a notification transmission to an observer of the first user.

12. The method of claim 11, wherein the real-world location criteria for the notification is different from the real-world location criteria for the event.

13. The method of claim 11, wherein the real-world criteria for the notification is the same as the real-world criteria for the event.

14. The method of claim 11, wherein the notification information is obtained via a graphical user interface configured to receive entry or selection of the notification information from the observer.

15. The method of claim 11, wherein the notification transmission includes one or more of an email, a message in a social networking platform, a message in a micro-blogging service, a text message, a phone call, or a virtual space message.

16. The method of claim 11, wherein the observer is the second user.

* * * * *